(12) United States Patent
Robke et al.

(10) Patent No.: US 9,411,963 B2
(45) Date of Patent: Aug. 9, 2016

(54) VISUAL DISPLAY OF RISK-IDENTIFYING METADATA FOR IDENTITY MANAGEMENT ACCESS REQUESTS

(71) Applicant: International Business Machines Corporation, Armonk, NY (US)

(72) Inventors: Jeffrey Tobias Robke, Apex, NC (US); John Leslie Harter, Cary, NC (US); Brian Robert Matthiesen, Rancho Santa Margarita, CA (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 14/324,954

(22) Filed: Jul. 7, 2014

(65) Prior Publication Data
US 2016/0004868 A1    Jan. 7, 2016

(51) Int. Cl.
*H04L 29/06* (2006.01)
*G06F 21/57* (2013.01)

(52) U.S. Cl.
CPC ........ *G06F 21/577* (2013.01); *G06F 2221/033* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 7,707,514 B2* | 4/2010 | Forstall | ................. | G06F 3/0486 715/741 |
| 8,732,168 B2* | 5/2014 | Johnson | .............. | G06F 21/6245 707/729 |
| 2005/0182722 A1* | 8/2005 | Meyer | .................... | G06Q 10/06 705/40 |
| 2005/0240467 A1* | 10/2005 | Eckart | .................... | G06Q 40/12 705/30 |
| 2007/0055564 A1* | 3/2007 | Fourman | ................ | G06Q 10/10 705/7.39 |
| 2008/0249793 A1* | 10/2008 | Angell | .................... | G06Q 30/02 705/1.1 |
| 2009/0320137 A1* | 12/2009 | White | ................ | G09B 19/0053 726/25 |
| 2011/0126111 A1 | 5/2011 | Gill et al. | | |
| 2012/0220148 A1 | 8/2012 | Leidner et al. | | |
| 2013/0212683 A1* | 8/2013 | Sher-Jan | ................. | G06F 21/00 726/25 |
| 2013/0219474 A1 | 8/2013 | Kuhnen et al. | | |
| 2014/0114962 A1* | 4/2014 | Rosenburg | ........... | G06Q 10/063 707/723 |
| 2014/0122331 A1* | 5/2014 | Vaish | ................. | G06Q 20/3674 705/41 |

OTHER PUBLICATIONS

Nimalaprakasan, S.; Ramanan, S.; Malalasena, B.A.; Shayanthan, K.; Gamage, C.; Fernando, M.S.D. Privacy Enhanced Data Management for an Electronic Identity System. CITISIA 2009. Relevant pp. 358-363.    http://ieeexplore.ieee.org/stamp/stamp.jsp?tp=&arnumber=5224184&tag=1.*

(Continued)

*Primary Examiner* — Jeremiah Avery
(74) *Attorney, Agent, or Firm* — Gail H. Zarick; David H. Judson

(57) ABSTRACT

An identity management system is augmented to enable a manager to associate "risk" metadata with different types of access requests representing computer system accounts that can be requested by authorized users. When an authorized user then requests access to a particular account, any "risk" associated with that access is shown to the user, typically in the form of a visual "badge" or other such indicator. The badge includes an appropriate informational display (e.g., "High Risk" or "Regulated") that provides an appropriate risk warning. The risk metadata badge information preferably also is displayed for risk-based access request approval routing; in such context, the risk metadata may also determine the risk approval workflow itself. Thus, for example, if the risk metadata is present when the authorized user requests access, an approval workflow may be modified so that the request approval is routed appropriately.

21 Claims, 7 Drawing Sheets

(56) References Cited

OTHER PUBLICATIONS

Zhang, Xuan; Wuwong, Nattapong; Li, Hao; Zhang, Xuejie. Information Security Risk Management Framework for the Cloud Computing Environments. 2010 IEEE 10th International Conference on Computer and Information Technology (CIT). Relevant pp. 1328-1334. http://ieeexplore.ieee.org/stamp/stamp.jsp?tp=&arnumber=5577860.*

* cited by examiner

FIG. 6

| General Information | Manage Groups > Change Group > Access Information |
|---|---|

Select the Define an Access check box to activate the access fields. Specify the access information, such as name, type, description, and owner. Additionally, you can choose to enable access requests by users and specify whether or not the access will appear in the Common Access list. If the Define an Access check box is subsequently unchecked, the information in the fields will be cleared when the operation is completed.

- Access Information

☑ Define an Access ⎯ 602

Access status
- ⦿ Enable Access
- ○ Enable Common Access ⎯ 604
- ○ Disable Access

• Access name

[Financial Reporting Applicat] ⎯ 606

Access type for this group

[Applications Business Applications Finance] ⎯ 608

> Change access type

Access description

[Reporting of financial results] ⎯ 610

Access owner

[      ] [Search...] [Clear] ⎯ 612

Approval workflow

[No Approval Required ▲] ⎯ 614

☐ Notify users when access is provisioned and available for use ⎤
☐ Notify users when access is de-provisioned                    ⎦ 616

┌─ Access icon ─────────────────────────────────┐
│  No URL is set. The access type icon will be used. │
│  Image preview    Icon URL                         │ ⎯ 618
│      [icon]      [                    ]            │
└────────────────────────────────────────────────┘

Search terms

620 ⎯ [                    ] [Add]
      [                    ] [Delete]

Additional information

[                                        ] ⎯ 622

▼ Badges
  Specify the badges associated with this group ⎯ 624
  [Add] [Remove]                                              600
  626 ⎯ ☐ Badge text    Badge class    Preview
        [High risk]     [Red ▲]        [High risk] ⎯ 630
  628 ⎯ ☐ Badge text    Badge class    Preview...
        [Regulated]     [Green ▲]      [Regulated]

[OK] [Cancel]

VISUAL DISPLAY OF RISK-IDENTIFYING METADATA FOR IDENTITY MANAGEMENT ACCESS REQUESTS

BACKGROUND

1. Technical Field

This disclosure relates generally to security within an enterprise computing environment and, in particular, to providing risk-related information to users having permitted access to enterprise resources.

2. Background of the Related Art

It is well-known in the prior art to provide software and services to deploy policy-based provisioning solutions. These solutions helps companies automate the process of provisioning employees, contractors, and business partners with access rights to the applications they need, whether in a closed enterprise environment or across a virtual or extended enterprise. A known product of this type is IBM® Security Identity Manager.

When permitted users request access to applications, databases and other computer accounts, the users often are not aware of the regulatory implications or other risks associated with the request. Such regulatory requirements are quite varied and include, for example, the Sarbanes-Oxley (SOX) Act, the Health Insurance Portability and Accountability Act (HIPAA), and the like. Moreover, access to these special security considerations may require additional escalated approvals that also are unknown to the requestor. For example, a request to access a financial department's document database may have SOX compliance implications that must be signed-off for in advance by the Company's Chief Financial Officer. Submitting requests without knowledge of these often special considerations may give rise to security violations or cause unnecessary approval workflow for the requestor and/or his or her manager.

BRIEF SUMMARY

According to this disclosure, an identity management system is augmented to enable a manager entity (e.g., an administrator) to associate "risk" metadata with one or more different types of access requests representing computer system accounts that can be requested by authorized users. This risk metadata is then stored and accessible in the system. When an authorized user then requests access to a particular computer system account, any "risk" associated with that access (as defined by the risk metadata) is shown to the user, typically in the form of a visual "badge" or other such indicator. The badge includes an appropriate informational display (e.g., "High Risk" or "Regulated" or "Customer Data") that provides an appropriate risk warning. The visual appearance of the badge (e.g., its size, color, lettering style, position, etc.) is preferably configurable by the administrator. The risk metadata badge information preferably also is displayed for risk-based access request approval routing; in such context, the risk metadata may also determine the risk approval workflow itself. Thus, for example, if the risk metadata (e.g., "High Risk") is present when the authorized user requests access, an approval workflow may be modified appropriately so that the approval for the request is displayed with the risk badge and routed to a more senior authority than would otherwise be necessary if the risk metadata were not present.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 is a representative display interface that may be used to configure risk metadata badges according to this disclosure;

FIG. 7 is a representative request access catalog display page illustrating a set of computer system accounts that may be accessed by an authorized user and that may include risk badges according to this disclosure;

FIG. 8 is a representative display screen output to the authorized user illustrating (in this case) her pending access request together with the risk badge associated with the request; and FIG. 9 is a representative approval workflow display screen that illustrates a user's access request being presented to an approver together with the risk badge(s) associated with the access request.

DETAILED DESCRIPTION OF AN ILLUSTRATIVE EMBODIMENT

Figure 1:
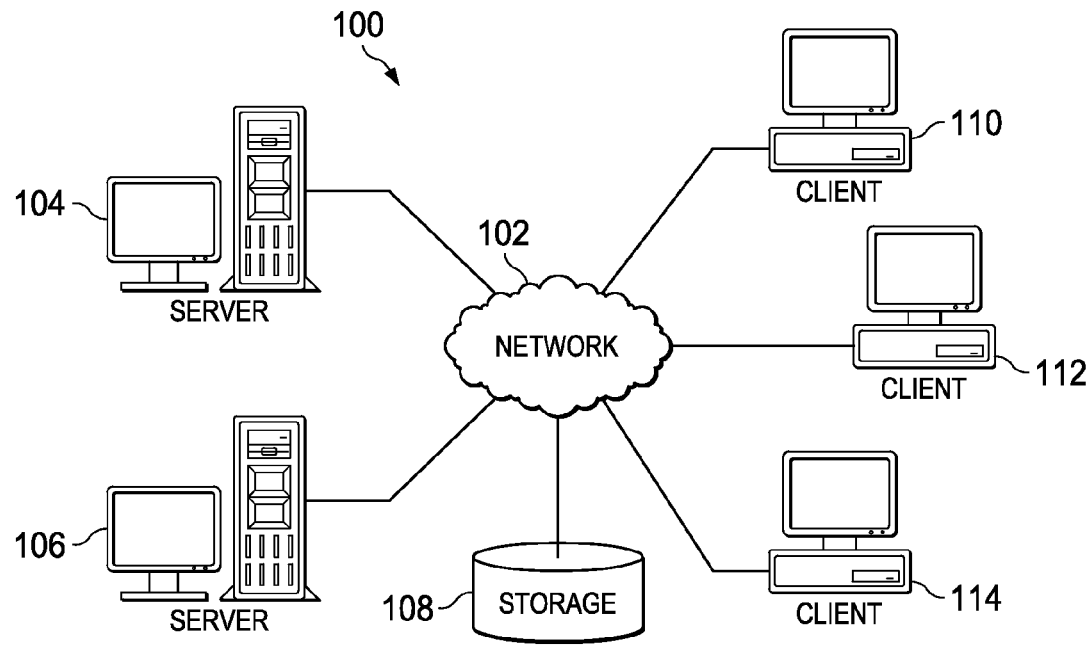
FIG. 1 depicts an exemplary block diagram of a distributed data processing environment in which exemplary aspects of the illustrative embodiments may be implemented.
Figure 2:
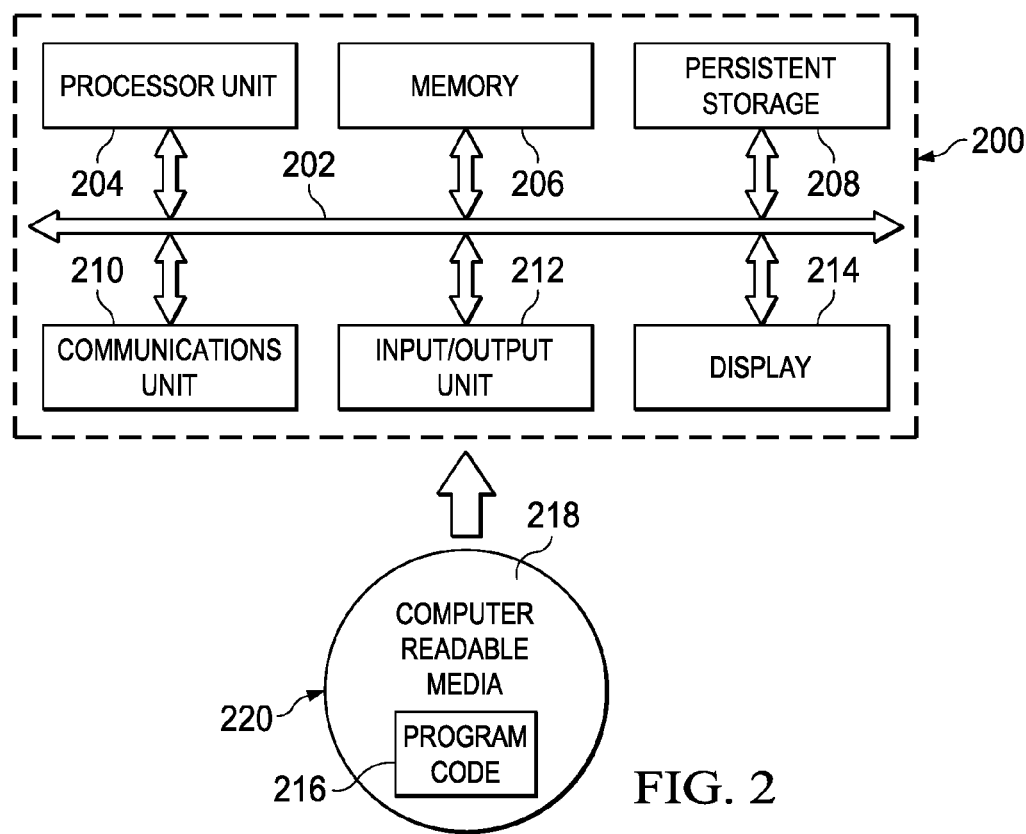
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data.

Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
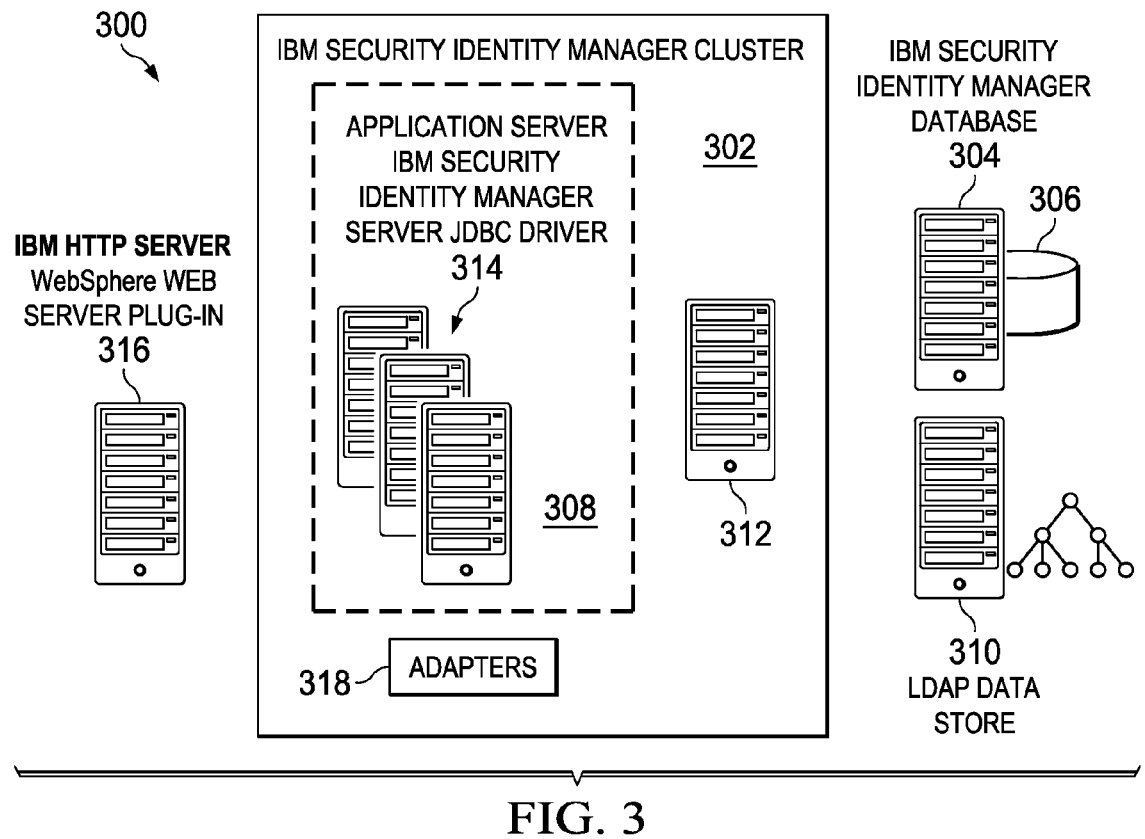
FIG. 3 is a representative security identity management system in which the disclosed subject matter may be implemented.

By way of further background, FIG. 3 is a block diagram of a commercially-available identity manager solution in which the subject matter of this disclosure may be implemented. This solution is merely representative and should not be taken to limit this disclosure. The representative commercial implementation is known as IBM® Security Identity Manager, Version 6.0. That product manages the identity records that represent people in a business organization. In particular, the product is an identity management solution that centralizes the process of provisioning records, such as provisioning accounts on operating systems, applications, etc., to users. Among other features, the product affords an organization the ability to add business processes and security policies to basic user management. As will be described in more detail below (and of relevance to this disclosure), the solution also affords the ability to add approvals for user requests to access requests. In general, the solution provides a uniform way to manage user accounts and to delegate administration, including self-service and a help desk user interface.

As illustrated in FIG. 3, the main components of the IBM® Security Identity Manager solution 300 include IBM Security Identity Manager Server 302 and required and optional middleware components, including adapters that provide an interface to managed resources. In a cluster configuration as illustrated, the components include a database server 304 that stores transactional and historical data, and a relational database 306 that maintains current and historical states of data. Computers that communicate with the database typically require a Java™ Database Connectivity driver (JDBC driver) 308. For example, a JDBC driver enables an IBM Security Identity Manager Server to communicate with a data source. IBM Security Identity Manager supports a JDBC type 4 driver to connect a Java-based application to a database. The supported database products are IBM DB2® Database, Oracle DB, and MS SQL Server database. As also seen in FIG. 3, the solution also includes a directory server 310 to store a current state of the managed identities (including user account and organizational data) in an LDAP (or equivalent) directory. Thus, for example, IBM Security Identity Manager supports the following products: IBM Tivoli® Directory Server, and Sun Enterprise Directory Server. The solution also preferably includes a directory integrator 312, such as IBM Tivoli Directory Integrator, to synchronize identity data in different directories, databases, and applications. IBM Tivoli Directory Integrator synchronizes and manages information exchanges between applications or directory sources. The solution also includes one or more application servers 314, such as IBM WebSphere® Application Server. WebSphere Application Server runs a Java virtual machine (JVM) that provides a runtime environment for the application code. The application server provides communication security, logging, messaging, and Web services. As also seen in FIG. 3, typically the configuration includes one or more WebSphere Application Servers and a deployment manager that manages the cluster. The solution also typically includes an HTTP server and WebSphere Web Server plug-in 316. An HTTP server provides administration of IBM Security Identity Manager through a client interface in a web browser. Finally, the solution typically includes one or more IBM Security Identity Manager adapters 318. An adapter is a program that provides an interface between a managed resource and the IBM Security Identity Manager Server. Adapters function as trusted virtual administrators on the target platform for account management. For example, adapters do such tasks as creating accounts, suspending accounts, and modifying account attributes. An IBM Security Identity Manager adapter can be either agent-based or agentless. An agent-based adapter is one wherein the user installs adapter code directly onto the managed resource with which it is designed to communicate. An agentless adapter is deployed onto the IBM Security Identity Manager Server and the system that hosts IBM Tivoli Directory Integrator. In this case, the adapter code is separate from the managed resource with which it is designed to communicate.

As noted above, the implementation shown in FIG. 3 is not intended to be limiting but, rather, merely illustrates one possible operating environment; other commercial or proprietary implementations may include similar components and functionalities.

Each of the machines shown in FIG. 3 may be implemented using the machine architecture shown in FIG. 2; the various machines may interact with one another as illustrated in FIG. 1.

The security identity management solution also may be implemented in whole or in part in a cloud-based solution.

Preferably, the Security Identity Manager solution includes an administrative console user interface. Among other functionality, the administrative console user interface enables an authorized user (e.g., an administrator having administrative privileges) the ability to perform access type management. Access types are a way to classify the kinds of access that users see. Preferably, the console exposes a task called manage access types to enable the administrator to classify the types of accesses that will be permitted within the organization. Typically, the following access types may be included by default: AccessRole, which is a role for IT resource access, Application, which enables access to an application, SharedFolder, which enables access to a shared folder, and MailGroup, which signifies membership in an email group. An administrator may create additional access types (e.g., for intranet web application, or Active Directory application shared folders, or the like). Over time, several accesses may be defined; an administrator may classify them into commonly-available accesses, or use categories for smarter searches for infrequent accesses.

Figure 4:
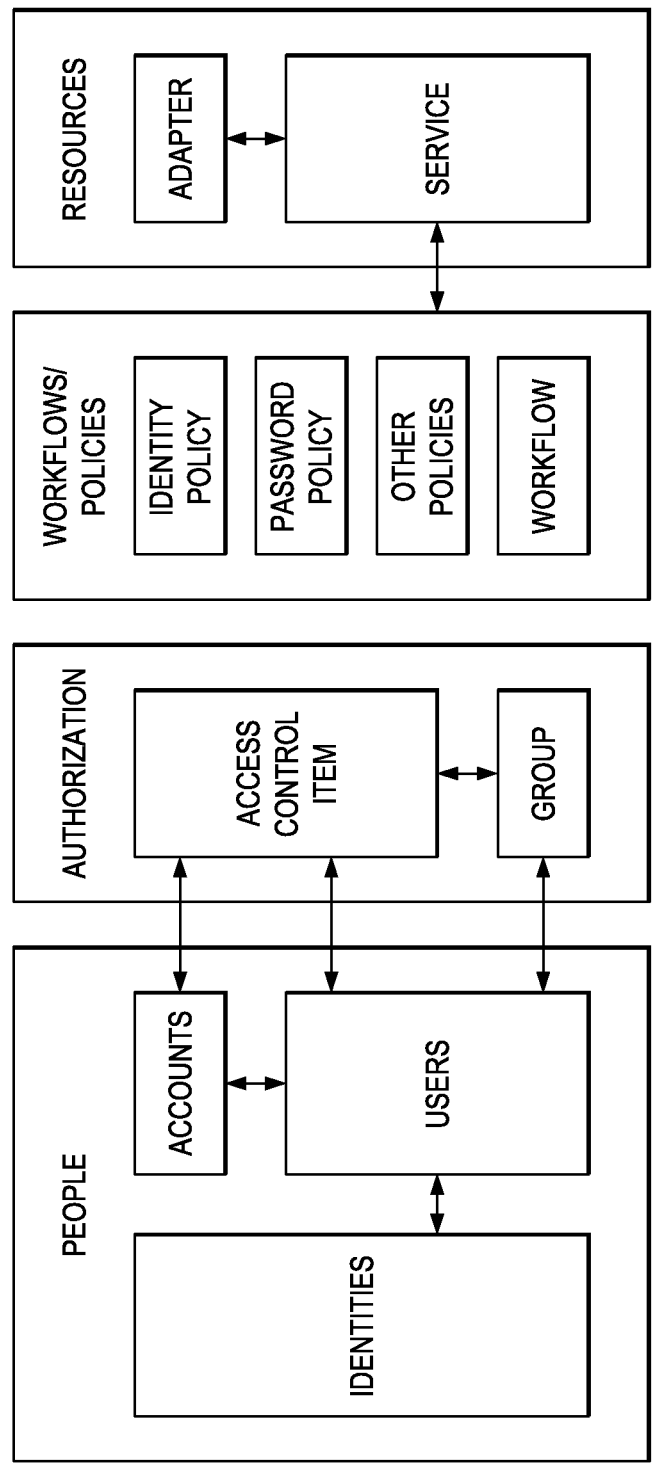
FIG. 4 illustrates sample identity management schema for an organization that is implemented in the management system of FIG. 3.

FIG. 4 illustrates a representative identity management schema for use in the solution. The schema typically comprises a set of entities. An administrator uses the entities for users, authorization, and resources to provide both initial and ongoing access in a changing organization. In this representative implementation, an "Identity" is a subset of profile data that uniquely represents a person in one or more repositories, and typically includes additional information related to the person. An "Account" is a set of parameters for a managed resource that defines your identity, user profile and credentials. A "User" is an individual who uses the Identity Manager to manage their accounts. An "Access Control Item" is data that identifies the permissions that users have for a specific type of resource. An access control item is created to specify a set of operations and permissions. Groups that use the access control item are then identified. A "Group" is used to control access to functions and data. Membership in a manager group provides a set of default permissions and operations as well as one or more views that group members need. A "Policy" is a set of considerations that influence the behavior of a managed resource (sometimes called a "service") or a user. A policy typically represents a set of organizational rules and the logic that the Identity Manager system uses to manage other entities, such as user IDs, and applies to a specific managed resource as a service-specific policy. An "Adapter" is a software component that provides an interface between a managed resource and the Identity Manager Server. A "Service" represents a managed resource, such as an operating system, a database application, or another application that the Security Identity Manager manages. For example, a managed resource might be a LotusNotes® application. Users access these services by using an account on the service.

Visual Display of Risk-Identifying Metadata for Identity Management Access Requests With the above as background, the subject matter of this disclosure is now described. As described above, and according to this disclosure, an identity management system is augmented (i.e. extended or supplemented) to enable a manager entity (e.g., an administrator) to associate "risk" metadata with one or more different types of access requests representing computer system accounts that can be requested by authorized users. This risk metadata is then stored and accessible in the system.

When an authorized user then requests access to a particular computer system account, any "risk" associated with that access is shown to the user, typically in the form of a visual "badge" or other such indicator. The badge includes an appropriate informational display (e.g., "High Risk" or "Regulated" or "Customer Data") that provides an appropriate risk warning. The visual appearance of the badge (e.g., its size, color, lettering style, etc.) is preferably configurable by the administrator, as is its position relative within the access request page. Typically, and as will be seen, the risk badge(s) are displayed in association with the particular computer system account. An account typically represents some enterprise resource, such as an operating system, a database application, or any other protected resource (system, service, product, device, application, database, process, or the like).

According to another aspect, preferably the risk metadata badge information also is displayed for risk-based access request approval routing; in such context, the risk metadata may also determine the risk approval workflow itself. Thus, for example, if the risk metadata (e.g., "High Risk") is present when the authorized user requests access, an approval workflow may be modified appropriately so that the badge is displayed to the approver, and the approval for the request is routed to that person. When risk metadata is associated with a particular account (as indicated by the badge(s)), approval is required from a more senior authority than would otherwise be necessary if the risk metadata were not present.

Figure 5:
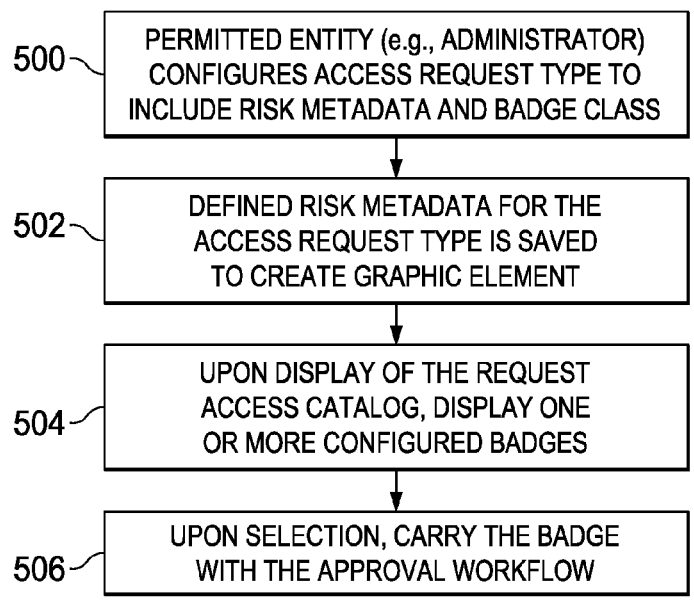
FIG. 5 illustrates a high level process flow of a function for configuring and applying risk metadata to an access request type according to this disclosure.

FIG. 5 is a process flow describing the high level process of the disclosure. The routine begins at step 500 with a permitted entity (e.g., an administrator) configuring an access request type to include risk metadata. Typically, an access request type is associated with a particular computer system account (or set of accounts). As will be seen, in one embodiment the risk metadata defines a visual indicator in the form of a badge that is then displayable by the system in association with a request access catalog page that identifies one or more applications that authorized users (e.g., employees, consultants, and other permitted entities) may request access. At step 502, the defined risk metadata for an access request type is saved in the system. At step 504, and upon display of the request access catalog page, a badge defined by configured risk metadata is displayed in association with other information about the request type. There may be more than one badge associated with a particular access request type. If the user then selects the application, the visual indicator may then be carried (i.e. propagated through the approval workflow. This is step 506. As described above, during the approval workflow, the badge preferably is displayed to the approver, e.g., as a reminder about the application (or other protected resource) for which the user is requesting access. If there are multiple approvers, the badge may be used to determine which of the multiple approvers will receive the request to approve access.

Preferably, the system administrator defines several access request types, with each access request type representing a computer system account (or, more generally, a protected resource) that can be requested by an authorized user. During a configuration operation, the system administrator creates a metadata file in the manner described. Under the covers, the system saves the risk metadata, typically as a key-value pair of information, with the access request type name as the key, and the text (or other display attribute(s)) for the badge being the value. Upon saving the badge configuration, the information is stored in the system. Subsequently, when the authorized user desires access to the computer system account, the badge is displayed (e.g., from a request access display screen). In other words, when the end user desires access to the computer account from the request access display screen, he or she is presented with the one or more badges that alert to the user of one or more special risks and/or processing requirements for that access type.

A particular request access type may have one or more badges associated therewith.

Each badge may have a particular display configuration, and the display attributes (size, color, lettering, style, position) may be varied. The information in the badge may be varied based on time-of-day, day-of-week, an access identifier (e.g., IP or other machine address), or some other attribute. In the latter case, the "look and feel" of the badge is thus customized at the point-of-display as needed, although the typical use case will be a static configuration that the administrator defines. A particular badge may be a combination of multiple visual elements.

The risk metadata may also be output in other ways, such as aurally (spoken information), or as a combination of visual and aural elements.

The particular message in a risk metadata badge may be varied.

Turning now to FIG. 6, a representative configurator tool is illustrated to enable an administrator to configure a particular request access type to include a risk metadata badge. This tool may be implemented as a web page (or set of web pages). In this example, the administrator console UI includes a Manage Group>Change Group>Access Information display screen 600 through which the administrator selects a Define an Access check box 602 to activate the access fields. As shown in the example, the administrator can select an Access Status 604 radio button, define the Access name in the field 606, define an Access type for this group 608, provide an Access description 610, define an Access owner 612, select from a dropdown list an Approval workflow 614, determine whether to Notify users about access provisioning or de-provisioning 616, identify an Access icon 618, identify one or more Search terms 620 that might return the access request type, and provide additional information 622 to the system. According to this disclosure, the configuration display screen is augmented to enable the administrator to "Add" or "Remove one or more risk metadata Badges 624. Each Badge may include specify Badge text selected from the dropdown list 626, and a Badge class or type (e.g., color) selected from the dropdown list 628. The Badge class represents a particular icon. Together, the Badge text and the type (as represented by the icon) comprise a risk metadata badge. Once the administrator makes an appropriate selection of the Badge text and class/type, a Preview 630 of the defined risk metadata Badge is then displayed to the administrator. The administrator saves the Badge(s) for the access request type by selected OK. Once saved in the system (preferably as a set of key-value(s) as described above), the Badge is available to be displayed (or, more generally, output) as a visual indicator of one or more "risks" associated with the computer system account for which the badge has been provisioned.

The badge configuration tool may include other attributes and elements as described above. Thus, the configuration tool may include UI elements (widgets, such as fill-in fields, radio buttons, dropdown lists, etc.) that the administrator uses to further specify how the risk metadata will be output by the system. The display interface elements (lists 626 and 628) are thus merely representative.

While manual configuration of the badges is illustrated, the system may be provided with a predetermined set access request type-badge associations. Thus, a badge may be associated with an access request type manually (as illustrated), automatically or programmatically.

Figure 7:
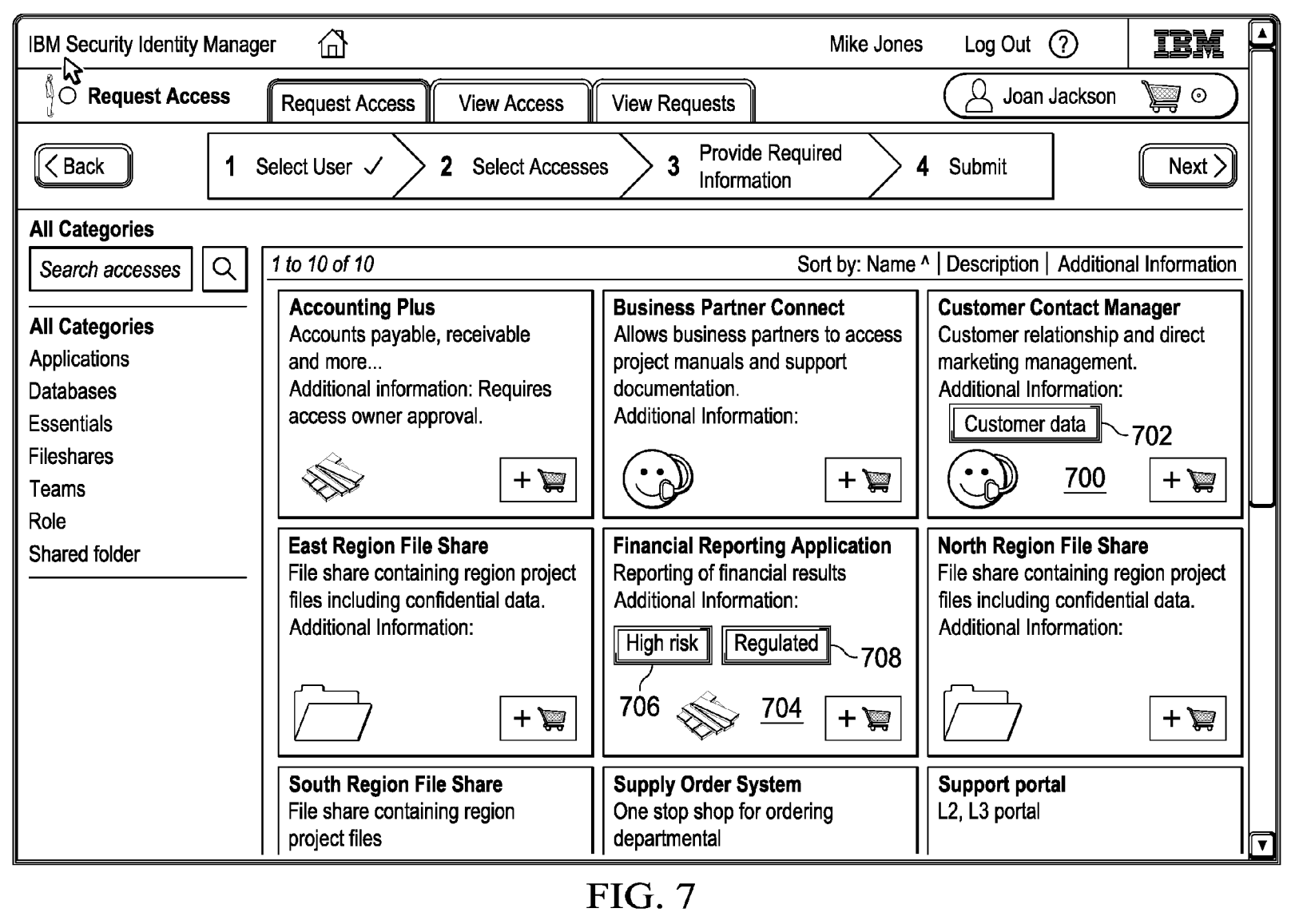

FIG. 7 illustrates a request access catalog page that is available to an authorized user of the identity management system and that includes display of various badges that have been configured using the configuration tool in FIG. 6. Typically, the authorized user is authenticated and authorized by other systems. As can be seen, the catalog page identifies several categories of resources, such as applications, databases, essentials, fileshares, and the like. In this example scenario, a number of applications are identified for potential selection: Accounting Plus, Business Partner Connect, Customer Contact Manager, East Region File Share, Financial Reporting Application, and North Region File Share. Here, the Customer Contact Manager application 700 has a Customer data badge 702 that is visually displayed as "Additional information" for the user. The badge 702 warns the user that access to the application will expose customer-specific data, such as personally identifiable information (PII). Likewise, the Financial Reporting Application 704 has two (2) distinct badges, a "High Risk" badge 706, and a "Regulated" badge 708 indicating that the information exposed by the application is highly sensitive and subject to regulatory requirements. The particular attributes (e.g., color, font, etc.) of the badges may vary depending on the sensitivity of the information, nature of the regulatory requirements, etc. Thus, for example, the "High Risk" badge might be red, the "Regulated" badge might be green, and the "Customer data" badge might be blue. The badge attributes typically are static, but these attributes also may be varied based on various factors, such as time-of-day, source IP address of the requesting user, or the like.

Figure 8:
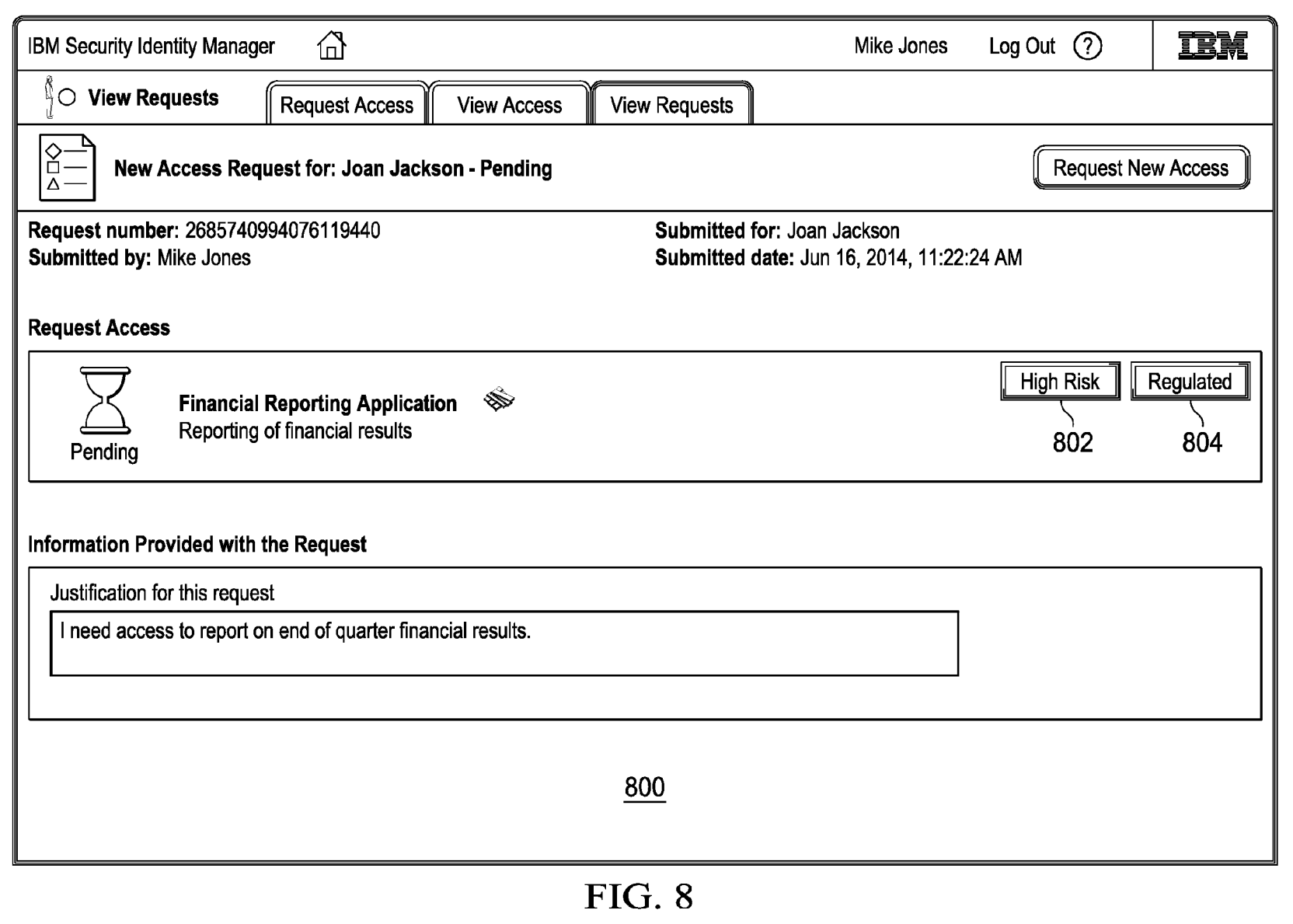
Figure 9:
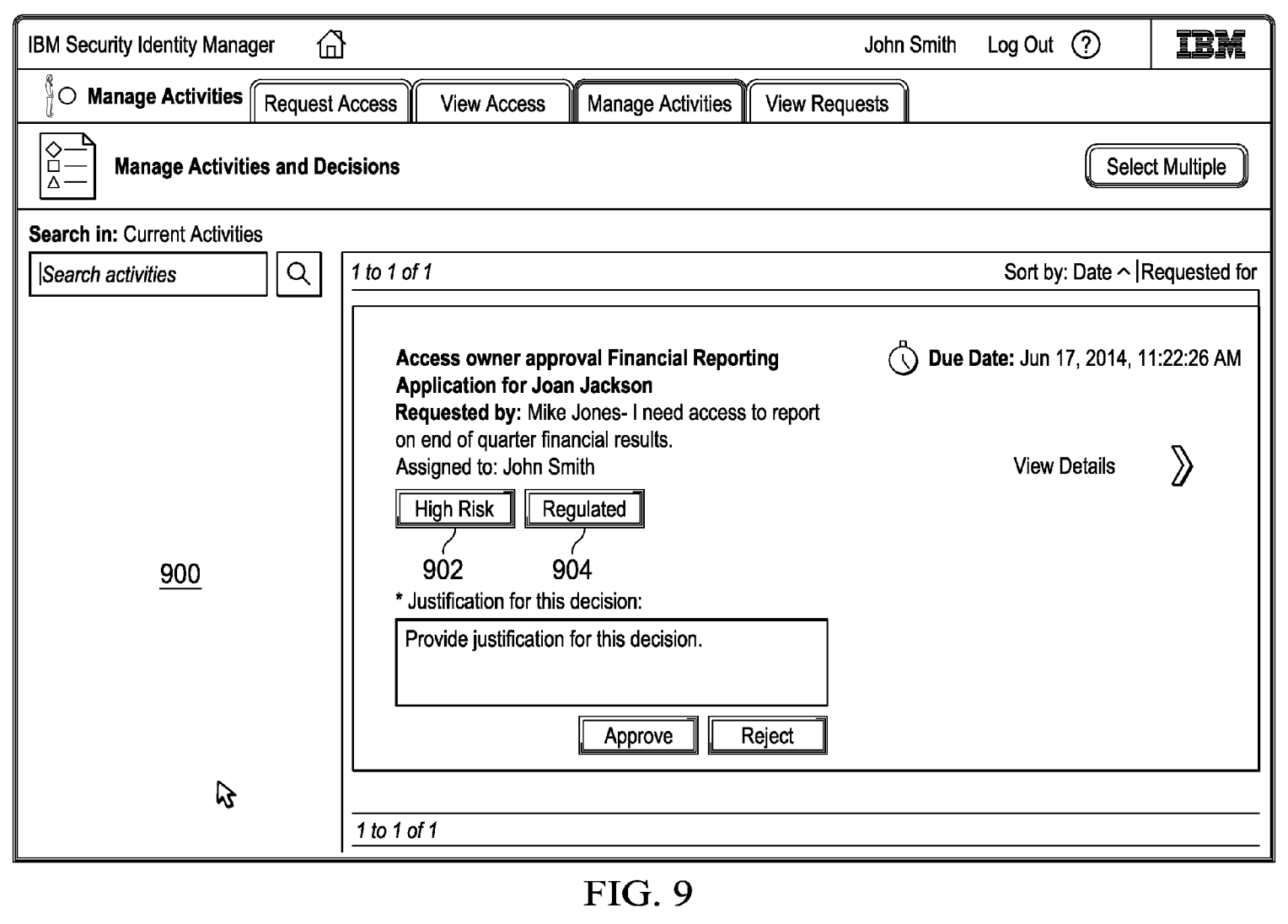

Assume now that the authorized user has selected the Financial Reporting Application from the panel in FIG. 7. This application has an associated approval workflow, e.g., a requirement that a supervisor approve the access request. FIG. 8 illustrates a New Access Request—Pending page output to the user indicating that her approval request is pending. Preferably, this page 800 includes the badges 802 and 804 that were associated with the request access option. FIG. 9 illustrates a Manage Activities and Decisions display screen that opens on the approver's desktop. This screen indicates that the authorized user has requested access to the Financial Reporting Application. As also illustrated, display screen 900 includes the same High Risk and Regulated badges 902 and 904 that were displayed on the catalog page. Thus, preferably, the risk metadata badges are propagated through the entire approval workflow so that all participants (the authorized user, the approver(s), others) have the same "view" of these badges. In addition, preferably the badge content determines the approval routing itself. In particular, the content of the badge (or perhaps multiple badges in combination) determines which of multiple approvers may receive the approval request. In the example shown in FIG. 9, the access to the Financial Reporting Application that is "High Risk" and "Regulated" (as indicated by the badges) has been routed the Company CFO given its sensitivity.

More generally, different access request types requiring approval are routed appropriately, preferably based on the risk metadata (as reflected in the badges).

The subject matter described herein has significant advantages over the prior art. Using the approach, administrators can create risk "badges" that can be customized for a particular access request type and then displayed to users authorized to access the computer system account associated to that type. When the user desires to access the account, the risk badge(s) warn of special risks or other sensitivities that may be associated with the information being accessed. The risk metadata preferably is carried through any approval workflow to ensure that all participants have a consistent view of what information is being accessed and by whom, and what if any special handling or access requirements, restrictions or other sensitivities might be associated with the information.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. In particular, the badge configuration tool, the access request page, or the workflow approval functions (or components thereof) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the badge configurator, request access page and the approval workflow components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method of identifying a risk associated with access to one or more computer system accounts being managed by an identity management system, comprising:

for at least one access request type, the access request type representing computer system accounts that are requested by authorized users and managed by the identity management system, receiving data that defines risk metadata for the access request type, and associating the risk metadata with a type of visual indicator;

displaying, on a display screen, a user interface that includes request access options to access the one or more computer system accounts being managed by the identity management system; and displaying, on the display screen, a graphic element in association with at least one of the request access options in the user interface, the graphic element being defined by the risk metadata and the type of visual indicator to identify the risk associated with access to the computer system account;

wherein the receiving and displaying operations are carried out by software executing in a hardware element and provide for an improved operation of the identity management system.

2. The method as described in claim 1 wherein the risk metadata defines one of: a risk associated with requesting access, a handling requirement, an approval requirement, and a compliance requirement.

3. The method as described in claim 1 wherein the risk metadata and the type of visual indicator define an appearance of the graphic element.

4. The method as described in claim 1 wherein the risk metadata defines text in the graphic element and the type of visual indicator defines a color of the graphic element.

5. The method as described in claim 1 further including:
responsive to selection of the at least one request access option having the graphic element associated therewith, displaying an approval screen; and
displaying the graphic element in association with the approval screen.

6. The method as described in claim 1 further including:
responsive to selection of the at least one request access option having the graphic element associated therewith, identifying a given approver from a set of approvers based on the risk metadata.

7. The method as described in claim 1 further including:
defining a set of access request types; and
for each defined access request type, associating a visual indication of the risk associated with the access request type.

8. An apparatus, comprising:
a processor;
computer memory holding computer program instructions that when executed by the processor identify a risk associated with access to one or more computer system accounts being managed by an identity management system, the computer program instructions comprising:
program code operative for at least one access request type, the access request type representing computer system accounts that are requested by authorized users and managed by the identity management system, to receive data that defines risk metadata for the access request type, and to associate the risk metadata with a type of visual indicator;
program code operative to display, on a display screen, a user interface that includes request access options to access the one or more computer system accounts being managed by the identity management system; and
program code operative to display, on the display screen, a graphic element in association with at least one of the request access options in the user interface, the graphic element being defined by the risk metadata and the type of visual indicator to identify the risk associated with access to the computer system account and thereby provide for an improved operation of the identity management system.

9. The apparatus as described in claim 8 wherein the risk metadata defines one of: a risk associated with requesting access, a handling requirement, an approval requirement, and a compliance requirement.

10. The apparatus as described in claim 8 wherein the risk metadata and the type of visual indicator define an appearance of the graphic element.

11. The apparatus as described in claim 8 wherein the risk metadata defines text in the graphic element and the type of visual indicator defines a color of the graphic element.

12. The apparatus as described in claim 8 wherein the computer program instructions further include:
program code responsive to selection of the at least one request access option having the graphic element associated therewith to display an approval screen; and
program code to display of the graphic element in association with the approval screen.

13. The apparatus as described in claim 8 wherein the computer program instructions further include:
program code responsive to selection of the at least one request access option having the graphic element associated therewith to identify a given approver from a set of approvers based on the risk metadata.

14. The apparatus as described in claim 8 wherein the computer program instructions further include:
program code to define a set of access request types; and
program code operative for each defined access request type to associate a visual indication of the risk associated with the access request type.

15. A computer program product in a non-transitory computer readable medium for use in a data processing system, the computer program product holding computer program instructions which, when executed by the data processing system, identify a risk associated with access to one or more computer system accounts being managed by an identity management system, the computer program instructions comprising:
program code operative for at least one access request type, the access request type representing computer system accounts that are requested by authorized users and managed by the identity management system, to receive data that defines risk metadata for the access request type, and to associate the risk metadata with a type of visual indicator;
program code operative to display, on a display screen, a user interface that includes request access options to access the one or more computer system accounts being managed by the identity management system; and
program code operative to display, on the display screen, a graphic element in association with at least one of the request access options in the user interface, the graphic element being defined by the risk metadata and the type of visual indicator to identify the risk associated with access to the computer system account and thereby provide for an improved operation of the identity management system.

16. The computer program product as described in claim 15 wherein the risk metadata defines one of: a risk associated with requesting access, a handling requirement, an approval requirement, and a compliance requirement.

17. The computer program product as described in claim 15 wherein the risk metadata and the type of visual indicator define an appearance of the graphic element.

18. The computer program product as described in claim 15 wherein the risk metadata defines text in the graphic element and the type of visual indicator defines a color of the graphic element.

19. The computer program product as described in claim 15 wherein the computer program instructions further include:
program code responsive to selection of the at least one request access option having the graphic element associated therewith to display an approval screen; and
program code to display of the graphic element in association with the approval screen.

20. The computer program product as described in claim 15 wherein the computer program instructions further include:
    program code responsive to selection of the at least one request access option having the graphic element associated therewith to identify a given approver from a set of approvers based on the risk metadata.

21. The computer program product as described in claim 15 wherein the computer program instructions further include:
    program code to define a set of access request types; and
    program code operative for each defined access request type to associate a visual indication of the risk associated with the access request type.

\* \* \* \* \*